United States Patent
Krauss et al.

(10) Patent No.: US 9,075,915 B2
(45) Date of Patent: *Jul. 7, 2015

(54) MANAGING WINDOW FOCUS WHILE DEBUGGING A GRAPHICAL USER INTERFACE PROGRAM

(71) Applicant: International Business Machines Corporation, Armonk, NY (US)

(72) Inventors: Kirk J. Krauss, Los Gatos, CA (US); James I. Martineau, Somerville, MA (US); Lorelei M. McCollum, Somerville, MA (US); Michael S. McCowan, Somerville, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/078,661

(22) Filed: Nov. 13, 2013

(65) Prior Publication Data

US 2014/0173569 A1 Jun. 19, 2014

Related U.S. Application Data

(63) Continuation of application No. 13/717,768, filed on Dec. 18, 2012, now Pat. No. 8,938,718.

(51) Int. Cl.
*G06F 9/44* (2006.01)
*G06F 11/36* (2006.01)

(52) U.S. Cl.
CPC .......... *G06F 11/3664* (2013.01); *G06F 11/362* (2013.01)

(58) Field of Classification Search
USPC .................................. 717/123–131; 715/500
IPC ............. G06F 11/362,11/3664, 11/3668, 11/30, G06F 11/3688
See application file for complete search history.

(56) References Cited

U.S. PATENT DOCUMENTS

| | | | |
|---|---|---|---|
| 5,093,914 A * | 3/1992 | Coplien et al. | 717/129 |
| 5,889,994 A * | 3/1999 | Brown et al. | 717/125 |
| 5,926,638 A | 7/1999 | Inoue | |
| 6,026,235 A * | 2/2000 | Shaughnessy | 717/127 |
| 6,202,199 B1 * | 3/2001 | Wygodny et al. | 717/125 |
| 6,282,701 B1 * | 8/2001 | Wygodny et al. | 717/125 |

(Continued)

OTHER PUBLICATIONS

Chern et al, "Debugging with Controlflow Breakpoints", ACM, pp. 96-106, 2007.*

(Continued)

*Primary Examiner* — Anil Khatri
(74) *Attorney, Agent, or Firm* — John W. Hayes

(57) ABSTRACT

An embodiment of the present invention utilizes the abilities of an operating system to manage the window focus while debugging a graphical user interface program. In an example, a debugger program intercepts a breakpoint in the code of a graphical user interface computer program undergoing automated testing by a separate computer program. The debugger program instructs the operating system to save states of the window focus. Responsive to determining the breakpoint condition has ended, the debugger program instructs the operating system to restore saved states of the window that had focus prior to the breakpoint condition. Another embodiment of the present invention arranges similar window focus management where an operating system on its own is unable to save and restore states of the window that had focus prior to the breakpoint condition.

8 Claims, 7 Drawing Sheets

(56) References Cited

U.S. PATENT DOCUMENTS

| | | | |
|---|---|---|---|
| 6,721,941 | B1 | 4/2004 | Morshed et al. |
| 6,978,440 | B1 * | 12/2005 | Pavela ........................... 717/125 |
| 7,058,928 | B2 * | 6/2006 | Wygodny et al. ............. 717/128 |
| 7,086,033 | B2 | 8/2006 | Bates et al. |
| 7,124,404 | B1 * | 10/2006 | Bebout et al. ................. 717/127 |
| 7,293,259 | B1 | 11/2007 | Dmitriev |
| 7,386,839 | B1 * | 6/2008 | Golender et al. ............. 717/131 |
| 7,398,519 | B2 * | 7/2008 | Arnold et al. ................. 717/129 |
| 7,748,033 | B2 * | 6/2010 | Nita et al. ......................... 726/11 |
| 7,823,135 | B2 * | 10/2010 | Horning et al. ............... 717/127 |
| 7,840,851 | B2 | 11/2010 | Hayutin |
| 8,010,839 | B2 | 8/2011 | Shimura |
| 8,024,708 | B2 * | 9/2011 | Demetriou et al. ........... 717/124 |
| 8,239,836 | B1 | 8/2012 | Franz et al. |
| 8,312,413 | B2 * | 11/2012 | Stellari et al. ................. 716/139 |
| 8,312,435 | B2 * | 11/2012 | Wygodny et al. ............. 717/130 |
| 8,468,502 | B2 * | 6/2013 | Lui et al. ....................... 717/127 |
| 8,504,994 | B2 * | 8/2013 | Golender et al. ............. 717/128 |
| 8,572,573 | B2 | 10/2013 | Baliga et al. |
| 8,572,578 | B2 | 10/2013 | Stall |
| 8,671,393 | B2 | 3/2014 | Bates |
| 8,752,017 | B2 * | 6/2014 | Hossain et al. ............... 717/124 |
| 8,819,626 | B2 * | 8/2014 | Hariharan et al. ............ 717/120 |
| 8,832,660 | B2 * | 9/2014 | Lindo et al. ................... 717/124 |
| 8,935,671 | B2 * | 1/2015 | Sowerby et al. .............. 717/125 |
| 8,938,718 | B2 * | 1/2015 | Krauss et al. ................. 717/125 |
| 8,943,477 | B2 * | 1/2015 | Martineau et al. ........... 717/125 |
| 2004/0230954 | A1 | 11/2004 | Dandoy |
| 2005/0268285 | A1 | 12/2005 | Bagley et al. |
| 2007/0101293 | A1 | 5/2007 | Cherry et al. |
| 2009/0013313 | A1 | 1/2009 | Kato et al. |
| 2009/0320002 | A1 | 12/2009 | Peri-Glass et al. |

OTHER PUBLICATIONS

Barr et al, "TARDIS: Affordable Time-Travel Debugging in Managed Runtimes" ACM, pp. 67-82, 2014.*

Copperman, "Debugging Optimized Code Being Misled" ACM Transactions on Programming Languages and Systems, vol. 16, No. 3, pp. 387-427, 1994.*

Zhang et al, "BPGen: An Automated Breakpoint Generator for Debugging", ACM, pp. 271-274, 2010.*

Barton et al. "Dynamic and Graphical Web Page Breakpoints". ACM, pp. 81-90, 2010.

Chern et al. "Debugging with Control-flow Breakpoints". ACM pp. 96-106, 2007.

Koju et al. "An Efficient and Generic Reversible Debugger using the Virtual Machine based Approach". ACM, pp. 79-88, 2005.

Kumar et al. "Transparent Debugging of Dynamically Instrumented Programs". ACM, vol. 33, No. 5, pp. 57-62, 2005.

Kurniawan et al. "An IED Framework for Grid Application Development". IEEE, pp. 184-191, 2008.

Zanden et al. "An Explanation-Based, Visual Debugger for One-way Constraints". ACM, vol. 6, issue 2, pp. 207-216, 2004.

Martineau, J et al. U.S. Appl. No. 13/717,794, filed Dec. 18, 2012.

Martineau, J et al. U.S. Appl. No. 14/078,661, filed Nov. 13, 2013.

Cocoabuilder.com, "Xcode's ability to take away the window focus form other applications", Dec. 23, 2007, Printed Jul. 20, 2012, <URL: http://www.cocoabuildercom/archive/cocoa/195420-xcode-ability-to-take-away-the-window-focus-form-other-applications.html>.

IBM, "Focus-defined Application Meta-Toolbar", Oct. 28, 2004, IP.com [online], [retrieved on Nov. 4, 2011], Retrieved from: Prior Art Database, IP.com No. IPCOM000032273D.

Pettichord, "Design for Testability", Presented at Pacific Northwest Software Quality Conference, Portland, Oregon, Oct. 2002, Copyright: Bret Pettichord, 2002.

Krauss, K, et al. U.S. Appl. No. 13/717,768, filed Dec. 18, 2012.

Martineau, J. et al. U.S. Appl. No. 14/078,788, Office Action Response dated Jan. 30, 2015.

* cited by examiner

MANAGING WINDOW FOCUS WHILE DEBUGGING A GRAPHICAL USER INTERFACE PROGRAM

CROSS-REFERENCE TO RELATED APPLICATIONS

This application is a continuation of U.S. patent application Ser. No. 13/717,768 filed on Dec. 18, 2012, the entire content and disclosure of which is incorporated herein by reference.

FIELD OF THE INVENTION

The present invention relates generally to the field of debugging software, and more particularly to window focus on graphical user interfaces.

BACKGROUND OF THE INVENTION

Most computing devices, applications and complex tools rely upon a graphical user interface to interact with, receive input from and provide information to users. There are many types of user interfaces which can be implemented and they can include graphical user interfaces (GUI), character user interfaces (CUI) and web-based user interfaces. The development of such software containing user interfaces, more specifically GUIs, involves the testing and verification of the performance and proper functionality of the GUI being tested. GUI testing can be performed via manual interaction sufficient to ensure that all crucial aspects of the GUI are properly covered. Depending on the complexity of the GUI, the number of manual operations required to test the GUI can easily be of a large magnitude. As an alternative to manual checking, a GUI automation program can be used to automatically simulate these otherwise manual operations. Since a GUI automation program is software in itself, it also requires testing to ensure proper functionality.

Automated GUI testing can include performing a pre-defined set of GUI automation program functions on the GUI of a computer program under test (CPUT) while a debugger program works to ensure the GUI automation program is functioning properly. During this process, the CPUT's GUI normally has the focus of the display. The GUI automation program and the debugger program typically operate in an integrated development environment (IDE) GUI displayed behind or alongside the CPUT's GUI. During the process of debugging an application, the debugger program's GUI assumes the focus and is displayed in front of the CPUT's GUI in order to provide information, such as a stack trace, variable values, and current lines of code, to the user. This assumption of focus by the debugger program's GUI occurs when the debugger detects a break in the execution of the GUI automation program, e.g. when a breakpoint is "hit". Once the debugger program has the focus, focus may not return to the CPUT's GUI without user input. When focus has been restored to the CPUT's GUI, certain attributes of that GUI, such as any context menu displayed at the time the breakpoint was hit, may no longer appear. In that case, the GUI automation testing may not be able to properly continue its pre-defined set of GUI automation program functions, because the CPUT's GUI is no longer in the anticipated state after the breakpoint has been hit.

A similar problem can occur during debugging of a CPUT without GUI automation. If a breakpoint is hit while a context menu with programmatically-determined content is displayed, and if further debugging toward a desired program state relies on the display of that original context menu content, then further useful debugging may not be possible after the breakpoint has been hit, unless the CPUT is restarted and debugged again from the beginning.

SUMMARY

Embodiments of the present invention disclose a method, computer program product, and computer system for managing window focus while debugging a computer program under test. The computer program that is subject to this method, computer program product, and computer system may be under test via a graphical user interface automation program or may simply be running in the presence of a debugger.

In an example, a computer program for automated testing or for debugging instructs an operating system to save states of the window focus of a computer program under test, associated with a graphical user interface, that is being debugged. The computer program for automated testing or for debugging determines that a breakpoint has been reached. Responsive to determining the breakpoint condition has ended and that the computer program under test will continue running, the computer program for automated testing or for debugging instructs the operating system to restore saved states of the window focus. The computer resumes testing and/or debugging from the preceding test code script of the graphical user interface automation program. In another example, similar window focus management is arranged where the operating system on its own is unable to save and restore states of the window that had focus prior to the breakpoint condition.

DETAILED DESCRIPTION

Figure 1:
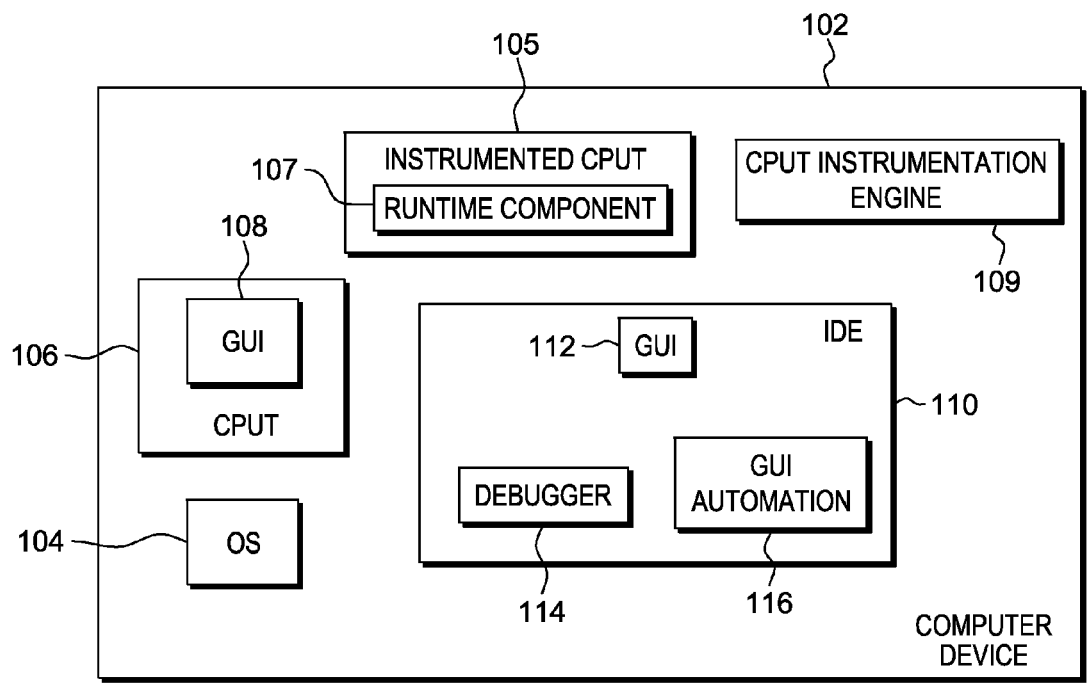
FIG. 1 is a functional block diagram illustrating a computing device, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may include a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, conductive cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating computer device 102 containing various programs, in accordance with one embodiment of the present invention. Computer device 102 may be a laptop computer, tablet computer, netbook computer, personal computer (PC), a desktop computer, a personal digital assistant (PDA), a smart phone, or any programmable electronic device capable of hosting a graphical user interface (GUI). Operating system 104, computer program under test (CPUT) 106, instrumented CPUT 105, runtime component 107, CPUT instrumentation engine 109 and Integrated Development Environment (IDE) 110 are located on computer device 102. IDE 110 hosts debugger program 114 and GUI automation program 116. IDE 110 allows for the use of one graphical interface (i.e., GUI 112) for both debugger program 114 and GUI automation program 116, so that a user has one window capable of displaying output of each program instead of two separate windows. IDE 110 is not limited to hosting debugger program 114 and GUI automation program 116. It is recognized that though debugger program 114 and GUI automation program 116 may be accessed via IDE 110 sharing a single GUI in one embodiment, in another embodiment, these programs may have their own GUIs rather than sharing a single GUI (i.e. GUI 112). Debugger program 114 evaluates the state and code of CPUT 106 and can evaluate the state and code script of GUI automation program 116 so it can intercept, modify, and represent troubleshooting aspects of tasks being performed as part of CPUT 106 and its GUI 108. CPUT 106 may be any program utilizing a GUI.

Computer device 102 typically has an operating system (OS) 104 through which programs can be instantiated, accessed, and terminated. OS 104 may be, but is not limited to, Microsoft® Windows®, Linux® or Apple® Mac® OS. One of the functions of OS 104 is the ability to define the window focus (i.e., the primary active window that is displayed and that is a foremost designated target of user input on computer device 102). The window focus of computer device 102 may include, but is not limited to, the state of CPUT 106, and the position and state of the mouse and the state of the keyboard or other input devices attached to computer device 102. For example, if any commands are being entered by a keyboard into a tab located on GUI 108, all of this information can be tracked by OS 104. Since OS 104 can track the window focus, it also can have the ability to save any input made by GUI automation program 116.

Figure 2:
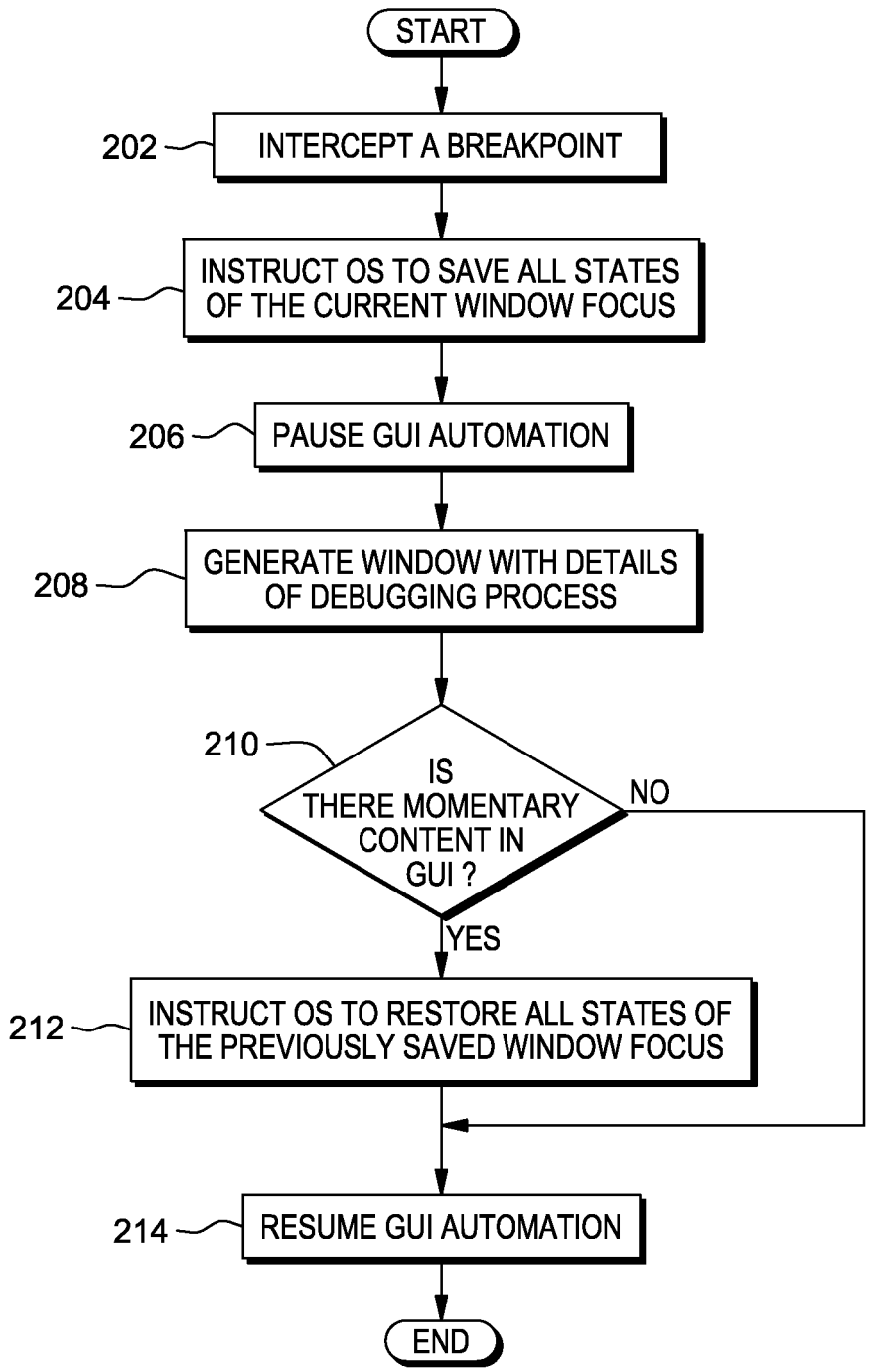
FIG. 2 is a flowchart depicting operational steps of a debugger program, on the computer device of FIG. 1, for managing window focus while debugging a graphical user interface automation program, in accordance with an embodiment of the present invention.

FIG. 2 is a flowchart depicting operational steps of debugger program 114 having the ability to restore window focus states, in accordance with an embodiment of the present invention.

In an exemplary embodiment, a GUI 108 is being tested by GUI automation program 116 while debugger program 114 can detect and/or be used to correct any errors in (i.e., debug) the code of CPUT 106 and/or the code script of GUI automation program 116. GUI automation program 116 and debugger program 114 are hosted by IDE 110, allowing them to share a single graphical display window. The GUI 108 retains the window focus of computer device 102 while GUI automation program 116 causes CPUT 106 to perform tasks automatically. As GUI automation program 116 performs scripted inputs on the GUI 108, the state of CPUT 106 can be evaluated by debugger program 114 to ensure that certain defined behaviors (i.e. exception conditions, values out of range, etc.) either do not occur or coincide as expected with the inputs being performed. As debugger program 114 is monitoring the state of CPUT 106, debugger program 114 can intercept a breakpoint (see FIG. 2, step 202). A breakpoint can include a specified instruction in the code of CPUT 106, an error or exception condition raised in the code of CPUT 106, or a pre-determined scheduled event pertinent to the state of CPUT 106 (i.e. a watchpoint).

Upon determining that a breakpoint has been intercepted, debugger program 114 instructs OS 104 to save states of the current window focus (step 204). Since CPUT 106 has the window focus, the states for CPUT 106 are saved by OS 104. The states of CPUT 106 are saved for the corresponding code script preceding the breakpoint. Saving the window states ensures GUI automation program 116 is properly synchronized by debugger program 114 in accordance with the state of the GUI 108 of CPUT 106. OS 104 saves the window focus states until debugger program 114 calls for them to be restored again.

Upon determining that OS 104 has saved the states of the current window focus, debugger program 114 pauses GUI automation program 116 at its current condition in executing the test automation script (step 206). Pausing GUI automation program 116 when the specified breakpoint hits matches the test automation script with the window focus states that have been saved in step 204.

Debugger program 114 generates a window with details of the state of CPUT 106 (step 208). The window may be a display of IDE 110 containing output from debugger program 114 or a separate modeless or pop-up window of debugger program 114. In this example, IDE 110 takes over the window focus and has debugger program 114 display information in the form of a status report to the user performing the debugging on CPUT 106 and GUI automation program 116. The information typically consists of, but is not limited to, one or more thread identifiers, stack traces, variables, registers, debug output messages, and current program lines of CPUT 106. The GUI 112 of IDE 110 becomes the window of focus, which may cause it to display in front of GUI 108.

Certain aspects of GUI 108, such as context menus, can be momentary in nature and can disappear when GUI 108 loses focus. The change of focus from the CPUT's GUI 108 to the IDE's GUI 112 can cause GUI automation program 116 to become desynchronized from CPUT 106 and its GUI 108, once GUI 108 again becomes the window of focus. Thereafter, the behavior or CPUT 106 and GUI 108 may be evaluated improperly by GUI automation program 116. The improper evaluation is the result of the code script of GUI automation program 116 anticipating the presence of the momentary aspects of GUI 108 that are no longer present, unless the debugger arranges for those momentary aspects to be redisplayed in accordance with the inventive arrangements described herein.

When the user instructs debugger program 114 to continue execution of CPUT 106, debugger program 114 determines if momentary content in GUI 108 has been lost (i.e., a context menu has been closed) (step 210). Determining whether the momentary content has been lost can involve the debugger program 114 having been informed by the GUI automation program 116 that momentary content in GUI 108 has been displayed. Determining whether the momentary content has been lost also can involve system calls made by debugger program 114 on behalf of CPUT 106, or by screen capture at the time the breakpoint is hit (at step 202) for comparison with known styles of momentary content, or by interception of system calls made by CPUT 106 as they occur to create and destroy momentary content, or by other means recognized in the art. Responsive to determining that no momentary content in GUI 108 has been lost as a result of the change of focus (no branch, step 210), debugger program 114 resumes the execution of CPUT 106 without arranging redisplay of any GUI content, so that with no further intervention GUI automation resumes synchronously (step 214). Responsive to determining the momentary content has been lost (yes branch, step 210), debugger program 114 instructs OS 104 to restore the states of the previously saved window focus so as to maintain synchrony with GUI automation (step 212). In another example, the momentary content is minimized so it no longer attains the window focus of GUI 108. As previously mentioned in the discussion of step 204, the states of the window focus preceding the breakpoint in the code script of GUI automation program 116 were saved by OS 104. These saved states are restored into focus, and as necessary the momentary content is restored from its minimized state, automatically, so GUI automation program 116 can continue to perform inputs on the GUI 108 in accordance with the code script of GUI automation program 116 subsequent to the breakpoint. Debugger program 114 resumes GUI automation program 116 (step 214) and continues debugging from the breakpoint which occurred in CPUT 106.

Accordingly, in this exemplary embodiment, proper window focus of CPUT 106 for the debugging of GUI automation program 116 is retained. Utilizing the abilities of OS 104 allows for the states of the window focus to be saved before a breakpoint and restored after a breakpoint so the window focus is not lost to the window generated by debugger program 114 in IDE 110. Restoring the momentary content otherwise lost when the IDE's GUI 112 assumes focus ensures GUI automation program 116 retains proper synchronization with CPUT 106 and its GUI 108.

The invention recognizes that in certain instances OS 104 may not be able to restore all the content of the window focus prior to the breakpoint. This is due in part to OS 104 not being able to restore content which was programmatically generated. For example, if CPUT 106 has computed a numerical value being shown on GUI 108, then OS 104 will not be able, on its own, to reiterate the computation that was involved in obtaining that numerical value. In another example, if there is a context menu on GUI 108, with source content from an external database table, that is updated by CPUT 106 to reflect the next row of that table every time that context menu is displayed on GUI 108, then OS 104 will not be able to properly restore the context menu. This is due in part to OS 104 not being able, on its own, to gather the required information from the external database table by saving the states of the window focus.

FIGS. 3A, 3B, 3C and 3D are flowcharts depicting operational steps of debugger program 114, having the ability to restore states, while reverting to a previous program state of CPUT 106 in accordance with another embodiment of the present invention.

In certain instances where OS 104 is not able to restore all the content of the window focus, debugger program 114 may track state information, which then can be called upon to restore momentary content lost when the window focus has changed after breakpoints. Since debugger program 114 has access to the code of CPUT 106 and every state of CPUT 106, debugger program 114 is able to automatically revert CPUT 106 until CPUT 106 is in the correct state to regenerate GUI 108 as it was prior to the breakpoint occurring, thus allowing any programmatically-generated content to be presented correctly in GUI 108 once the window focus is restored.

In an exemplary embodiment, in reference to FIG. 2 the yes branch of step 210 where the debugger program 114 continues with the execution of CPUT 106, debugger program 114 automatically reverts the state of CPUT 106 to the state in which the lost momentary content of GUI 108 was about to be generated and displayed. Determining the state to which to revert CPUT 106 can involve recording the registers and other state information at any time when a context menu or other momentary GUI content is about to be triggered via a system call, intercepting system calls and direct memory reads and writes, and recording the resulting memory changes, until either a breakpoint is hit or the momentary content is no longer displayed for programmatic reasons. When a breakpoint is hit and execution is about to continue, reverting CPUT 106 can include restoring the registers and other state information to the conditions just prior to the triggering of the momentary GUI content, and reverting all changes resulting from the intercepted system calls and direct memory reads and writes. The necessary interception of system calls and memory reads and writes can be performed via code instrumentation of the style performed by runtime analysis tools and omniscient debuggers, arranged in advance of the run. Alternatively, the necessary interception of system calls and memory reads and writes can be performed by dynamic interception of system calls and memory reads and writes, performed by a component of the debugger itself when it detects, via a watchpoint or an automatically-handled breakpoint, a condition where the display of momentary GUI content is triggered. Debugger program 114 also automatically indicates to GUI automation program 116 to revert execution of its script to the condition just prior to display of the same momentary content in GUI 108. Debugger program 114 resumes execution of the CPUT 106 from the state to which the CPUT 106 has been reverted, triggering redisplay of the momentary content that would otherwise have been lost as the result of changing window focus. Upon which, debugger program 114 will resume GUI automation as previously discussed in step 214.

Figure 3A:
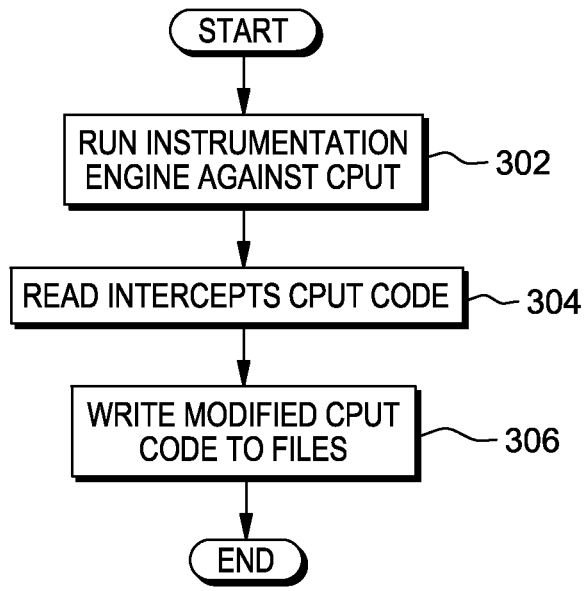
FIG. 3A is a flowchart depicting additional operational steps of a debugger program, on the computer device of FIG. 1, for managing computer product under test code, in accordance with another embodiment of the present invention.

To perform code instrumentation of the style performed by runtime analysis tools and omniscient debuggers, as illustrated in FIG. 3A, the user runs CPUT instrumentation engine 109 against CPUT 106 (step 302) wherein CPUT instrumentation engine 109 intercepts the code of CPUT 106 (step 304). Code that may be intercepted includes, but may not be limited to, memory writes, memory reads, memory allocations/de-allocations and system calls. CPUT instrumentation engine 109 writes the modified CPUT 106 code to files (step 306) comprising the executable code of instrumented CPUT 105. Thus, CPUT instrumentation engine 109 preserves backup versions of original CPUT 106 modules. Typically the user initializes the use of CPUT instrumentation engine 109 with instrumented CPUT 105

Figure 3B:
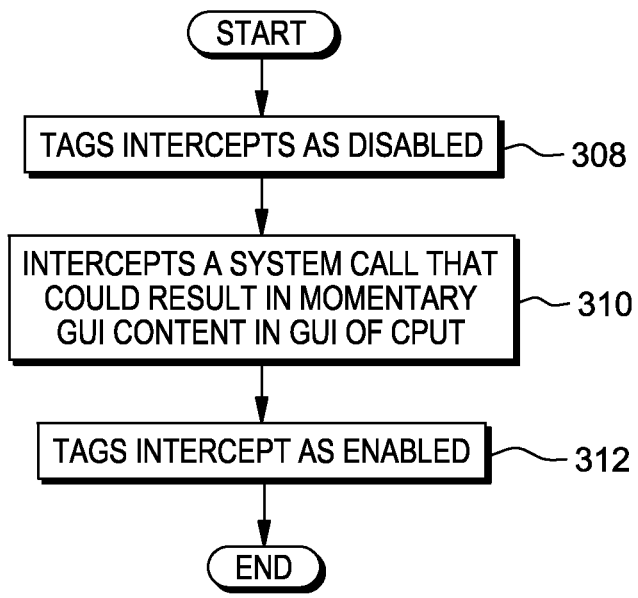
FIG. 3B is a flowchart depicting additional operational steps of a debugger program, on the computer device of FIG. 1, for intercepting system calls, in accordance with another embodiment of the present invention.

As illustrated in FIG. 3B, runtime component 107 may share a region of memory with debugger program 114. When runtime component 107 detects a memory write or a typical (non-GUI-oriented) system call, runtime component 107 returns control to instrumented CPUT 105 component that is writing that memory or performing the call (i.e., disabling intercepts). Runtime component 107 initially tags the intercepts as disabled (step 308) in which case runtime component 107 performs no actions based on intercepted memory writes or most typical system calls, other than allowing these operations to proceed as intended by instrumented CPUT 105. However, runtime component 107 monitors other components of instrumented CPUT 105 for any system call that could result in the display of momentary GUI content in GUI 108. A catalog of these system calls (i.e., a list of system call signatures) is maintained by the creators of runtime component 107.

As instrumented CPUT 105 is running, runtime component 107 intercepts a system call which can result in momentary GUI content in GUI 108 (step 310). Runtime component 107 tags intercepts as enabled (step 312). This initializes the tracking of any further memory allocations, de-allocations and writes, by runtime component 107, which thereafter keeps a record of these memory changes in shared memory. The tracked events are those being performed by CPUT components other than runtime component 107.

Figure 3C:
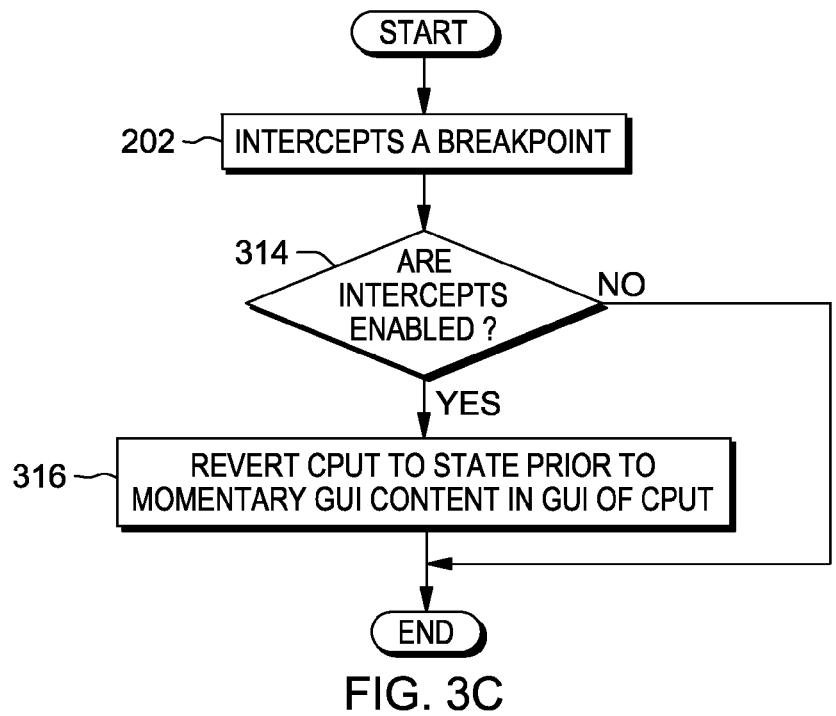
FIG. 3C is a flowchart depicting additional operational steps of a debugger program, on the computer device of FIG. 1, for intercepting breakpoints, in accordance with another embodiment of the present invention.

Illustrated in FIG. 3C debugger program 114, upon intercepting a breakpoint as previously mentioned in step 202 and thereafter determining that the run is about to continue, determines if the intercepts are enabled (step 314). Upon determining intercepts are disabled (no branch, step 314), debugger program 114 continues operating according to the steps previously discussed in FIG. 2. Upon determining intercepts are enabled (yes branch, step 314), debugger program 114 reverts instrumented CPUT 105 to its state at the moment just before the system call that caused momentary GUI content to be displayed (step 316). Debugger program 114 arranges for memory that has been allocated since that moment to be de-allocated, and for memory that has been de-allocated since that moment to be allocated and initialized to the content it had at that moment. Memory writes are reverted and registers are restored to their state at that moment, which includes all thread states and the threads' respective stack pointers. The overall task of reverting of the state of instrumented CPUT 105 may be performed by runtime component 107, by debugger program 114, by another program or program component running on OS 104, or by any combination thereof.

Figure 3D:
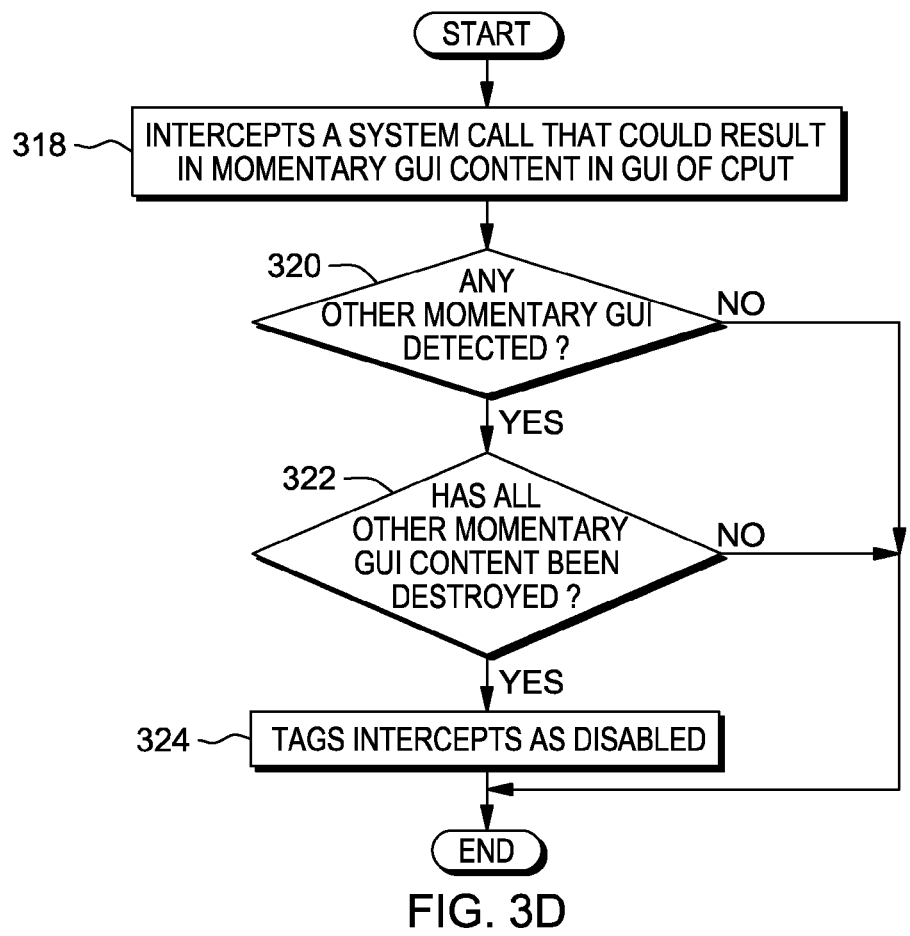
FIG. 3D is a flowchart depicting additional operational steps of a debugger program, on the computer device of FIG. 1, for handling breakpoints, in accordance with another embodiment of the present invention.

Illustrated in FIG. 3D, runtime component 107 intercepts a system call that could result in momentary GUI content in GUI 108 (step 318). In the event runtime component 107 does not detect any other momentary GUI content (no branch, step 320), instrumented CPUT 105 continues running. In the event runtime component 107 does detect other momentary GUI content (yes branch, step 320), runtime component 107 will determine if all other momentary GUI content has been destroyed (step 322). In the event runtime component 107 determines that some momentary content has not been destroyed (no branch, step 322), instrumented CPUT 105 continues running. In the event runtime component 107 determines that all momentary content has been destroyed (yes branch, step 322), runtime component 107 tags intercepts as disabled (step 324) and frees tracking data and clears shared memory. Upon which runtime component 107 continues monitoring for events that trigger momentary GUI content but thereafter keeps no further record of the CPUT's memory changes. Once the run of instrumented CPUT 105 has ended, backed up versions of CPUT 106 modules are restored.

FIGS. 4A, 4B, 4C, and 4D are GUI displays of a hypothetical scenario in which a window focus restore process is performed in accordance with an exemplary embodiment of the invention.

Figure 4A:
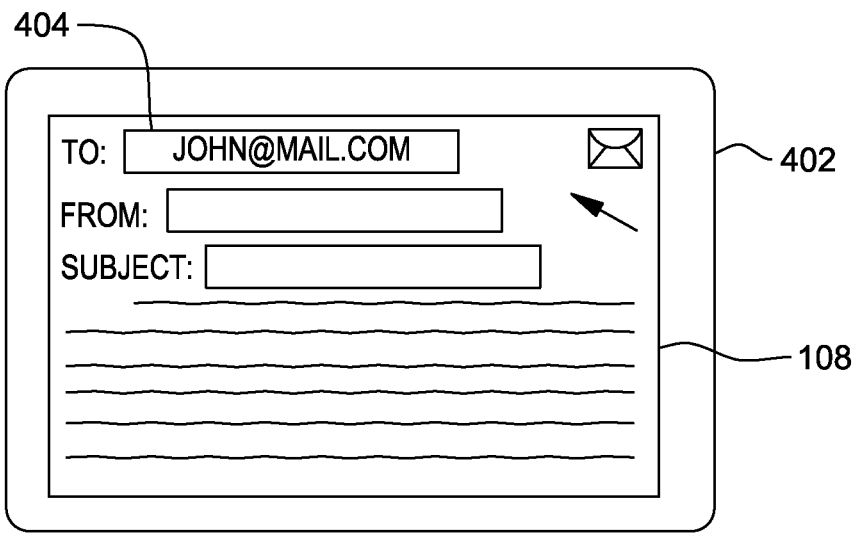
FIG. 4A is a diagram illustrating a hypothetical scenario wherein a graphical user interface automation program specifies a recipient of an email, while debugging the graphical user interface automation program, in accordance with an embodiment of the present invention.

FIG. 4A contains display 402 with the window focus on the GUI 108. In this example, CPUT 106 is a web application where GUI automation program 116 fills in the addresses of multiple email recipients and runs the email program to see whether the email can be delivered successfully. In order for the delivery of the email to be successful, GUI automation program 116 has to be able to enter the intended recipients of the email on the GUI 108. This process is initialized with GUI automation program 116 entering the primary recipient of the email into recipient tab 404.

Figure 4B:
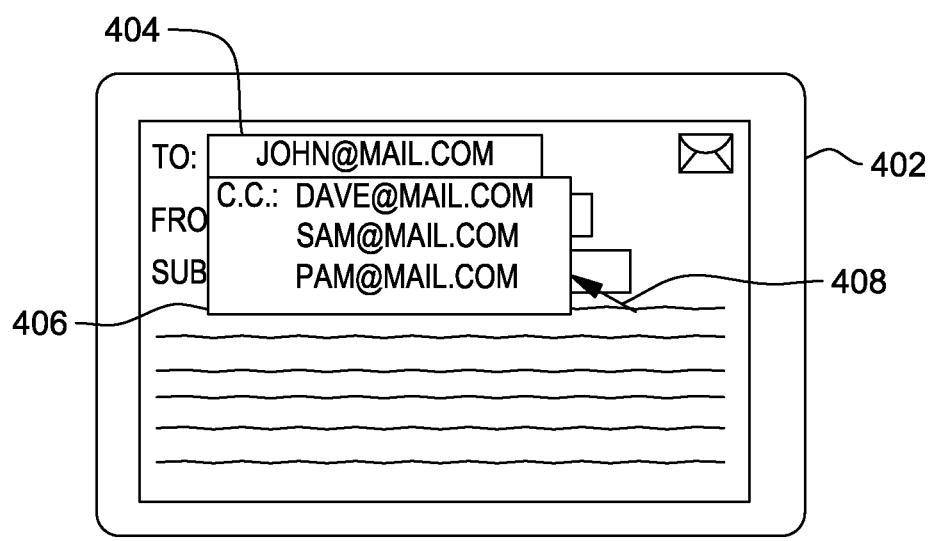
FIG. 4B is a diagram illustrating a hypothetical scenario wherein a graphical user interface automation program specifies carbon copy recipients, while debugging the graphical user interface automation program, in accordance with an embodiment of the present invention.

FIG. 4B shows GUI automation program 116 accessing carbon copy tab 406 through recipient tab 404 as a drop down tab selection. Accessing carbon copy tab 406 is done in order to list the remaining recipients of the email not entered into recipient tab 404. In order to access the carbon copy tab 406, the pointer receives inputs from GUI automation program 116 selecting recipient tab 404. Responsive to GUI automation program 116 selecting recipient tab 404, carbon copy tab 406 appears as a drop down selection tab and remains active only when the pointer is over carbon copy tab 406. Pointer position 408 represents an example of how carbon copy tab 406 can remain open for GUI automation program 116 to access the list of the remaining recipients of the email. When debugger program 114 intercepts a breakpoint (step 202) in the code for CPUT 106, debugger program 114 instructs OS 104 to save the states of the window in focus (i.e. CPUT 106) on display 402. In this example, the states include the information in recipient tab 404 and carbon copy tab 406, along with the visual representation of an active carbon copy tab 406 as a drop down selection associated with pointer position 408. OS 104 stores the saved states of the GUI 108 until debugger program 114 requests that the states be restored as the GUI 108 assumes focus.

Figure 4C:
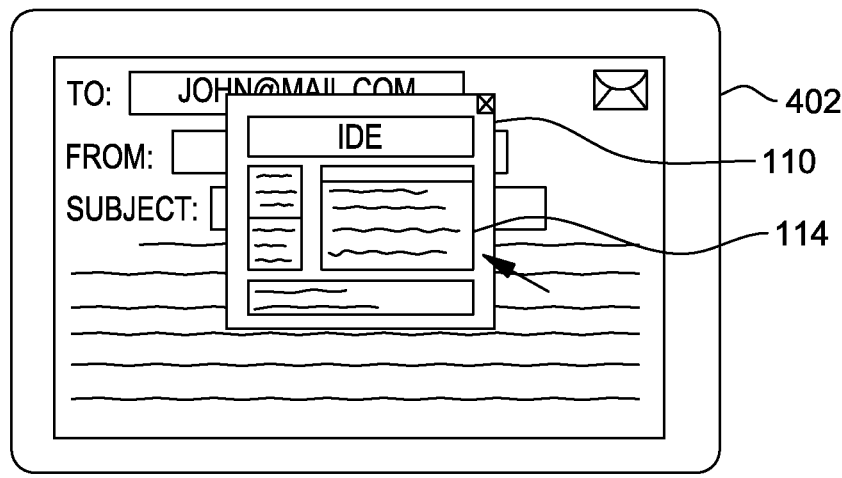
FIG. 4C is a diagram illustrating a hypothetical scenario wherein another graphical user interface obtains window focus, while debugging the graphical user interface automation program, in accordance with an embodiment of the present invention.

FIG. 4C shows IDE 110 taking over the window focus of display 402. IDE 110 takes over window focus as a result of debugger program 114 reaching a breakpoint. IDE 110 assumes the window focus because debugger program 114 requires interaction with the user. Once IDE 110 has assumed the window focus, carbon copy tab 406 is dismissed since pointer position 408 has changed, no longer keeping the drop down selection of carbon copy tab 406 active. If GUI automation program 116 were to continue past the breakpoint once the user, via IDE 110, instructs debugger program 114 to continue the run, GUI automation program 116 would not be able to perform the task of listing the remaining recipients of the email due to carbon copy tab 406 no longer being active. As debugger program 114 is about to trigger the run to continue, debugger program 114 first instructs OS 104 to restore previously saved states of the window focus (i.e., GUI 108).

Figure 4D:
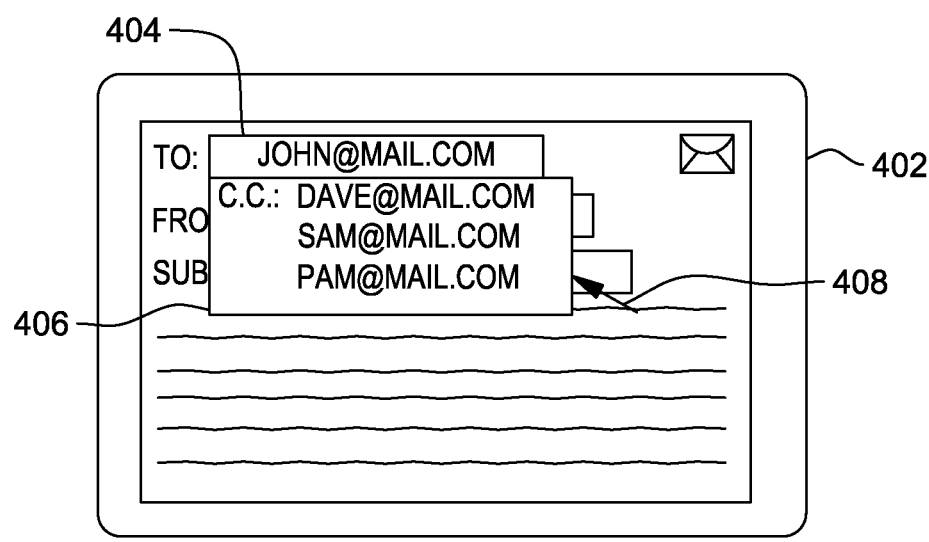
FIG. 4D is a diagram illustrating a hypothetical scenario wherein a graphical user interface automation program restores the specified carbon copy recipients, while debugging a graphical user interface automation program, in accordance with an embodiment of the present invention.

FIG. 4D illustrates the restoration of the previously saved states of GUI 108 of CPUT 106 on display 402 before the breakpoint was reached. Carbon copy tab 406 is restored along with pointer position 408 which allows for carbon copy tab 406 to remain open as a drop down tab selection. The process of successfully delivering an email to multiple recipients will continue from the breakpoint which was recognized by debugger program 114 in the code of CPUT 106 being tested in accordance with the test script of GUI automation program 116.

Figure 5:
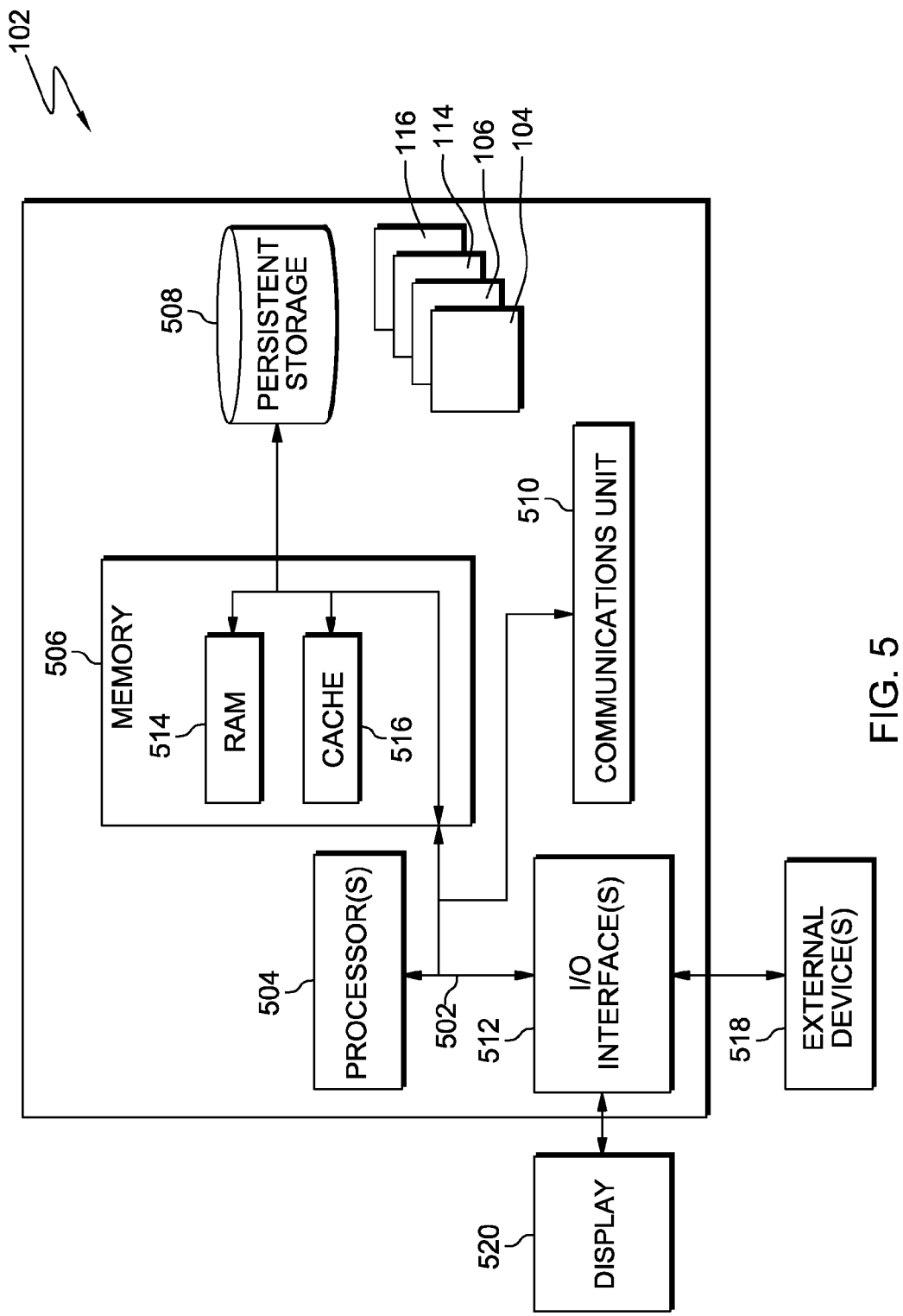
FIG. 5 depicts a block diagram of components of the computer device executing the debugger program, in accordance with an embodiment of the present invention.

FIG. 5 depicts a block diagram of components of computer device 102 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computer device 102 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

OS 104, CPUT 106, GUI automation program 116 and debugger program 114 are stored in persistent storage 508 and loaded into one or more memories of memory 506 for execution by one or more of the respective computer processors 504. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

In these examples, communications unit 510 includes one or more network interface cards. Communications unit 510 may provide communications through the use of either or both physical and wireless communications links. OS 104, CPUT 106, GUI automation program 116 and debugger program 114 may be downloaded to persistent storage 508 through communications unit 510.

I/O interface(s) 512 allows for input and output of data with other devices that may be connected to computer device 102. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., OS 104, CPUT 106, GUI automation program 116 and debugger program 114, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block diagrams may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

What is claimed is:

1. A method for managing window focus while debugging a computer program, the method comprising:

intercepting, by one or more processors, a breakpoint in program code of a computer program;

determining, by one or more processors, that operation of the computer program has reached the intercepted breakpoint;

responsive to intercepting the breakpoint in program code of the computer program, saving, by one or more processors, the state of window focus, wherein the state of window focus includes at least a graphical user interface of the computer program;

pausing, by one or more processors, operation of the computer program;

diverting, by one or more processors, the window focus to a debugger interface;

responsive to receiving an indication to resume operation of the computer program, restoring, by one or more processors, the saved state of the window focus; and reverting, by one or more processors, the computer program automatically to a previous state.

2. The method of claim 1, further comprising the steps of: resuming, by one or more processors, operation of the computer program from the previous state.

3. The method of claim 1, wherein the debugger interface displays one or more of: a status of the computer program and its code and the intercepted breakpoint, highlighted program code errors, user controls, or a status report.

4. The method of claim 1, wherein the breakpoint is one of: a break instruction in the program code, an error or exception condition raised during examination, compilation, or execution of the program code, or an event pertinent to the state of program execution.

5. The method of claim 1, wherein the indication to resume operation of the computer program comprises a command entered by a user.

6. The method of claim 1, wherein the computer program is a first computer program testing a second computer program by manipulating a GUI of the second computer program through automation.

7. The method of claim 6, wherein operation of the first computer program testing the second computer program remains synchronized with operation of the second computer program after a breakpoint is hit.

8. The method of claim 1, wherein the step of saving a state of window focus comprises instructing, by one or more processors, an operating system to save the state of window focus; and wherein the step of restoring the saved state of window focus comprises instructing, by one or more processors, the operating system to restore the saved state of window focus.

* * * * *